United States Patent [19]

Lara

[11] Patent Number: 4,929,896

[45] Date of Patent: May 29, 1990

[54] TRANSIENT ELECTROMAGNETIC METHOD FOR DETECTING IRREGULARIES ON CONDUCTIVE CONTAINERS HAVING VARIATIONS IN JACKET THICKNESS

[75] Inventor: Pedro F. Lara, Dallas, Tex.

[73] Assignee: Atlantic Richfield Company, Los Angeles, Calif.

[21] Appl. No.: 442,426

[22] Filed: Nov. 21, 1989

Related U.S. Application Data

[63] Continuation of Ser. No. 292,563, Dec. 29, 1988, abandoned.

[51] Int. Cl.$^5$ .................... G01N 27/82; G01R 33/12; G01B 7/10
[52] U.S. Cl. .................................. 324/240; 324/229; 324/71.2
[58] Field of Search ............... 324/220, 221, 229, 230, 324/231, 236, 237, 238, 239, 240, 241, 242, 243, 71.1, 71.2, 336, 425, 654, 720

[56] References Cited

U.S. PATENT DOCUMENTS

| | | | |
|---|---|---|---|
| 3,229,197 | 10/1961 | Renken, Jr. | 324/40 |
| 3,315,155 | 4/1967 | Colani | 324/10 |
| 3,707,672 | 12/1972 | Miller et al. | 324/41 |
| 4,271,393 | 6/1981 | Hansen et al. | 324/240 |
| 4,445,088 | 4/1984 | Schübel | 324/238 |
| 4,839,593 | 6/1989 | Spies | 324/240 |
| 4,843,319 | 6/1989 | Lara | 324/229 |
| 4,843,320 | 6/1989 | Spies | 324/229 |

Primary Examiner—Reinhard J. Eisenzopf
Assistant Examiner—Walter E. Snow
Attorney, Agent, or Firm—Geoffrey A. Mantooth

[57] ABSTRACT

A transient electromagnetic method for detecting irregularities on container walls by measuring wall thickness. The method utilizes a transmitting antenna and separate receiving antennas so as to form a loop-loop configuration. The transmitting antenna induces current into the container wall and the receiving antennas detect the induced current and produce received signals. The distance between the antennas and the container wall can vary, particularly where insulation is interposed therebetween. The variations in antenna distance affects the received signals. The affects are corrected by determining the maximum of the respective received signal and determining the arrival time of the maximum. The maximum and the arrival time are used to determine the thickness of the wall.

29 Claims, 2 Drawing Sheets

TRANSIENT ELECTROMAGNETIC METHOD FOR DETECTING IRREGULARIES ON CONDUCTIVE CONTAINERS HAVING VARIATIONS IN JACKET THICKNESS

This is a continuation of application Ser. No. 07/292,563 filed Dec. 29, 1988, now abandoned.

FIELD OF THE INVENTION

The present invention relates to a non-destructive method for detecting irregularities on electrically conductive containers such as pipelines, storage vessels, pressure vessels and the like that have variations in the thickness of a jacket, such as insulation, on said containers.

BACKGROUND OF THE INVENTION

Pipelines used to transport petroleum fluids such as crude oil and natural gas are commonly wrapped with a jacket of insulating material. For example, in Alaska and other cold climates, insulation is provided along pipelines to prevent the rapid cooling of oil and gas fluids, thus providing better transportability of these fluids. In refineries, pipelines transporting hot fluids are insulated in order to protect personnel from the high temperatures.

In insulated pipelines, the insulation retains moisture around the outside of the pipeline, which moisture promotes corrosion. Therefore, proper maintenance of insulated pipelines requires their periodic inspection for corrosion and other potential leak sources. However, the insulation, which serves as a thermal barrier, also serves as a barrier to inspection with many prior art inspection techniques. Removal of the insulation for inspection and rewrapping of insulation after inspection is both time consuming and expensive. The inspection process is complicated further on those pipelines covered with a metal jacket over the insulation. The metal jacket is used to keep out moisture. The metal jacket is typically provided in two half portions with each portion having flanges for aiding in the retention of the jacket on the pipeline. The two half portions of the jacket are joined together at the flanges which form seams. Water occasionally enters through the jacket seams and travels through the insulation to the pipe where it causes corrosion.

Prior art methods of detecting pipeline corrosion have proven inadequate. For example, pigs with corrosion detection equipment can only be used on pipelines that have access locations providing access to the interior of the pipelines; many pipelines lack such locations. Ultrasonic detection methods require removal of the metal jacket and insulation, a lengthy and expensive procedure. Radiography detection methods are potentially hazardous and the equipment is cumbersome, requiring impractical or inconvenient adjacent vehicular support. Furthermore, with radiography methods it is often difficult to distinguish between corrosion pits filled with corrosion products and uncorroded portions of pipe walls. What is needed then is a method of detecting corrosion through insulation and the surrounding jacket, and which method can be practiced with portable equipment.

Electromagnetic probing techniques provide such a method of detecting corrosion through insulation. In the prior art, frequency domain electromagnetic probing techniques are used to detect corrosion in aircraft fuel tanks. Frequency domain electromagnetic probing techniques utilize a small number of frequencies and measure magnitude and phase differentials between the transmitted signals and the received signals. However, because frequency domain techniques, as a practical matter, utilize only a small number of frequencies, the amount of information obtained is inherently limited, thus detracting from the accuracy of the techniques.

It has been discovered that corrosion of some insulated pipelines occurs in longitudinal bands along the bottom and side portions of the pipelines. Therefore, an antenna configuration that would take advantage of corrosion band geometry would be more effective in detecting corrosion. In the present invention, the receiving antenna is physically separate from the transmitting antenna to achieve better resolution. The transmitting antenna and the receiving antenna are positioned in a loop-loop arrangement or configuration.

The present invention discloses a method for detecting irregularities on the conductive walls of containers, utilizing physically separate transmitting and receiving antennas, wherein the distance between the antenna means and the wall varies across the area of the wall. On insulated containers, the distance between the antennas and the container wall will vary according to the insulation thickness, which thickness is typically nonuniform. Therefore, any method utilizing loop-loop antenna configurations must include steps for correcting for variations in distance between the antennas and the pipe wall.

SUMMARY OF THE INVENTION

It is an object of the present invention to provide a method for detecting irregularities such as corrosion on the walls of insulated containers, wherein the insulation has variations in thickness.

The method of the present invention includes the steps of providing transmitting antenna means connected with transmitter means and providing receiving antenna means connected with receiver means. The transmitting antenna means is placed in proximity to that portion of the electrically conductive container means wall which is to be investigated. The receiving antenna means is placed in proximity to the container means wall portion and in proximity to the transmitting antenna means so as to be separated from the transmitting antenna means. An abruptly changing current is provided to the transmitting antenna means by the transmitter means so as to induce current into the container means wall portion. The receiving antenna means detects the presence of and the decay of the induced current in the container means wall portion and produces a received signal. The received signal has a maximum occurring in the intermediate or late time ranges. The received signal also has an arrival time which is the time when the maximum occurs. The received signal is examined to determine its maximum and its arrival time, wherein the maximum and the arrival time provide an indication of the presence or absence of irregularities in the container means wall portion. The presence of irregularities is indicated by a maximum which is greater than a maximum obtained from an irregularity-free container means wall portion.

By separating the transmitting antenna means from the receiving antenna means so as to form a loop-loop configuration, the resolution of the method is improved, particularly where the irregularities which are being sought are bands of corrosion. Such corrosion bands are frequently found on insulated pipelines. The presence or absence of corrosion is inferred from the thickness of the wall.

With the loop-loop configuration, new methods of interpreting the received signals are required, especially to distinguish between the effects of wall thickness and antenna distance from the container means wall on the received signal. I have discovered that for loop-loop configurations, the pipe wall thickness strongly affects the magnitude of the maximum, but only weakly affects the arrival time, or time of occurrence, of the maximum. Furthermore, the antenna distance from the container means wall strongly affects the arrival time of the maximum, but only weakly affects the magnitude of the maximum voltage.

To determine the presence or absence of irregularities, the received signal obtained from the investigated wall portion is examined and the maximum and the arrival time are determined. The maximum and the arrival time are compared to reference maximums and reference arrival times obtained from reference container means with known wall thicknesses.

DESCRIPTION OF PREFERRED EMBODIMENTS

Figure 1:
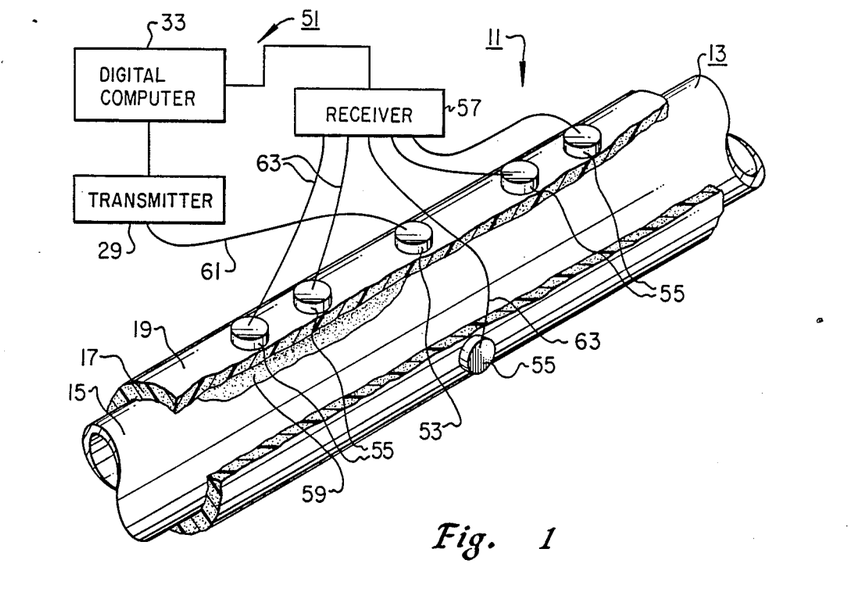
FIG. 1 is a schematic diagram showing a typical situation in which the method of the present invention, in accordance with a preferred embodiment, can be practiced, together with typical testing apparatus.

In FIG. 1, there is shown a schematic diagram showing a typical situation for practicing the method of the present invention, in accordance with a preferred embodiment. The method is used to detect irregularities, such as wall loss due to corrosion, in the conductive walls of containers. The corrosion can form on the inside or on the outside of the container.

The container shown in FIG. 1 is a portion of a pipeline 11. The pipeline is made up of a plurality of individual pipes 13. The pipes 13 each have a pipe wall 15 which made of an electrically conductive material such as steel. In the preferred embodiment, the pipeline is completely encased within an insulating material 17 and a metal jacket 19 that prevents direct access to the outside of the pipe wall 15 by the detecting apparatus 51. The jacket 19 has a thickness which is much less than the thickness of the pipe wall.

The detecting apparatus 51 includes transmitting antenna means 53, a transmitter 29, plural receiving antennas means 55, a receiver 57, and a digital computer 33.

The transmitting antenna includes an antenna 53 made up of plural turns of conductive wire wound around a core means. The core means is made of a non-magnetic and a non-conductive material such as plastic. The core means has a longitudinal axis; the conductive wire is wound circumferentially around the core means.

The transmitter 29 which is conventional, generates a train of pulses having magnitudes of 1 to 5 amps. A plurality of pulses are transmitted for each location of the antenna means 27 for data enhancement purposes. The pulses have abrupt fall times on the order of 10 to 100 microseconds. The pulses of the transmitter pulse train alternate polarity to eliminate dc bias in the instrumentation. The duration of each pulse is sufficiently long to stabilize the pulse magnitude so that there are no induced currents in the pipe wall before the end of the pulse. The transmitter 29 repeats the pulses at a repetition rate that allows all of the necessary data to be obtained for each pulse. For example, a thick pipe wall requires more time to obtain data than does a thinner pipe wall because the induced current takes longer to diffuse in the thick pipe wall. Thus, the repetition rate of pulses will typically be slower for thick pipe walls than for thinner pipe walls. The transmitting antenna 53 is connected to the transmitter 29 by a pair of wires 61.

Each receiving antenna means includes an antenna 55 made up of plural turns of conductive wire wound onto a core means. The core means of the receiving antennas are similar to the transmitting antenna core means. Each receiving antenna 55 is connected to the receiver by a respective pair of wires 63. The receiver 57 has provision for multiple channels. Each channel is connected to a single receiving antenna 55. Each receiver channel has an amplifier which is connected to an analog-to-digital converter. Each receiver channel is broad band with a wide (5 or 6 orders of magnitude) dynamic range.

The transmitter 29 and the receiver 57 are connected to the computer 33 which controls the pulse frequency of the transmitter and serves to record the data from the receiver channels. The computer 33 also provides an interface for an operator, which allows the operator to control the parameters of data acquisition (for example, transmitter pulse frequency, transmitter pulse magnitude) and the like.

The method of the present invention will now be described. First, the transmitting antenna 53 is placed on the pipeline jacket 19 so as to be in proximity with that portion of the pipe wall which is to be investigated.

The individual receiving antennas 55 are placed on the metal jacket 19, so as to be in proximity to the pipe wall 15. It has been discovered that on many of the insulated pipelines in cold climates corrosion 59 forms in bands that extend longitudinally. The bands of corrosion are typically found along the bottom and side portions of pipelines 11, presumably because the insulation 17 allows water to accumulate along those portions. (In FIG. 1, the band of corrosion 59 is shown on the top portion of the pipeline 11 for illustrative purposes.) The banded configurations of the corrosion 59 can be taken advantage of by separating the transmitting and receiving antennas 53, 55 so as to form loop-loop configurations or arrangements. Loop-loop antenna configurations can be made to have greater spatial resolution than a coincident loop antenna configuration, where the transmitting and receiving antennas are wound onto the same core means. This is because the receiving antenna in a loop-loop antenna configuration observes only a portion of the induced eddy currents diffusing in the pipe wall, whereas the receiving antenna in a coincident loop antenna configuration observes the entire induced eddy currents diffusing away from the transmitting antenna. The receiving antennas 55 are placed longitudinally and circumferentially from the transmitting antenna 29. Thus, in FIG. 1, there are first and second receiving antennas positioned on one side of and longitudinally of the transmitting antenna; third and fourth receiving antennas positioned on the other side of and longitudinally of the transmitting antenna, a fifth receiving antenna positioned circumferentially of the transmitting antenna, at about 90 degrees; and a sixth receiving antenna (not shown) positioned circumferentially of the transmitting antenna, at about 180 degrees from the fifth receiving antenna. Plural receiving antennas are used to increase data acquisition rates and to improve spatial resolution.

After the detecting apparatus 51 is setup, the transmitting antenna 53 is provided with an abruptly changing current so as to induce current into the pipe wall 15. In the preferred embodiment, current is induced into the pipe wall as follows: the transmitting antenna 53 is energized with 1-5 amps by the transmitter 29 for a period of time. As described above, the transmitting antenna is energized for a sufficient period of time such that the magnitude of the current in the transmitting antenna is stabilized to ensure no inadvertent eddy currents are induced into the pipe wall. Then, the transmitting antenna 53 is abruptly deenergized by the transmitter 29 by having the magnitude of the current fall rapidly to zero. This abrupt change in the transmitting antenna current induces eddy currents into the pipe wall 15.

As soon as the transmitting antenna is deenergized, the receiver 57 is turned on and all receiving channels are measured simultaneously. The individual receiving antennas 55 detect the presence of and the decay of the induced current and generate respective received signals on the respective receiving antenna channels.

The received signals are amplified and filtered. The received signals are then digitized and stored in the computer 33 for processing.

The transmitting and receiving procedure is repeated many times with the antennas located in the same position, in order to allow stacking of the received signals to increase the signal-to-noise ratio.

The received signals are processed to reduce noise and to aid in the interpretation of the signals.

The received signals obtained from loop-loop antenna configurations are different from the received signals obtained from coincident antenna configurations. In the coincident loop arrangement or configuration, the induced eddy currents diffuse outwardly away from the receiving antenna. The received signals from a coincident loop arrangement begin at some maximum voltage and then decay to smaller voltages until the signal becomes indistinguishable from noise.

Figure 2:
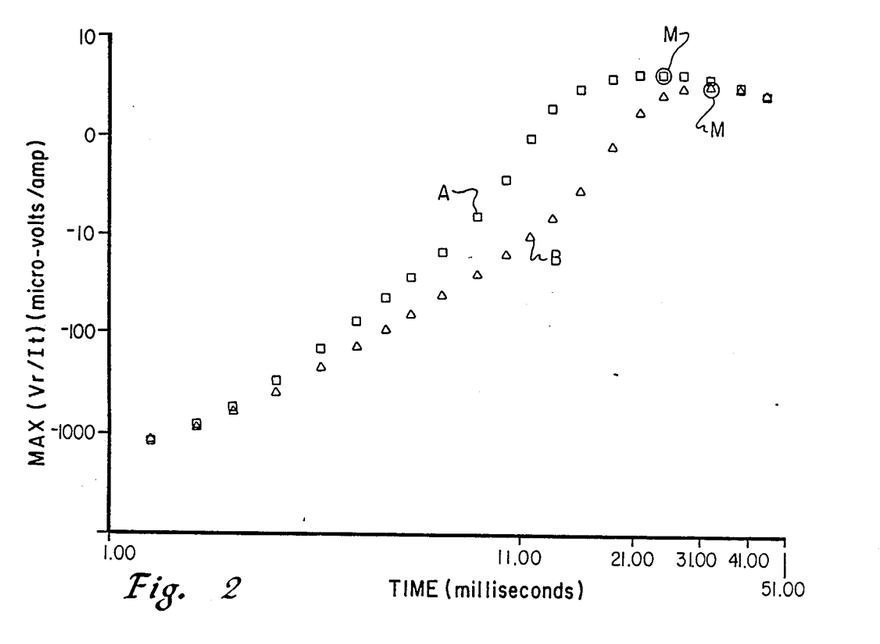
FIG. 2 is a graph showing the received signals obtained from a pipeline with the receiving antennas at different distances from the pipeline wall.

Referring to FIG. 2, each received signal A, B, obtained from a loop-loop arrangement, begins at some negative voltage and becomes more positive over a period of time. Each received signal typically changes sign at some time by crossing over zero volts. After changing signs, the respective received signal reaches a respective maximum M before decaying into noise. The maximum M occurs in the intermediate or late time ranges. The maximum M is distinguished from the initial maximum that occurs at early times, right after the receiver is turned on. The respective time that the respective maximum M occurs is referred to herein as the arrival time.

It is believed that the received signals from a loop-loop arrangement behave in this manner because of the diffusion of the eddy currents in the pipe wall. The eddy currents, which can be analogized to a wave, diffuse away from the transmitting antenna 53. As the eddy current wave approaches the receiving antenna, from the transmitting antenna, the received signal increases. The received signal reaches its maximum when the eddy current wave is underneath the receiving antenna. As the eddy current wave passes the receiving antenna, the received signal decreases, until it becomes indistinguishable from noise.

The loop-loop arrangement of antennas calls for new methods for interpreting the data in order to be useful in detecting the presence of corrosion. In particular, it is necessary to be able to distinguish between the effects on the received signals that are caused by the thickness of the pipe wall and the effects that are caused by the distance between the antennas and the pipe wall (hereinafter referred to as antenna distance). This is especially true for insulated containers, where variations in insulation thickness result in variations in antenna distance.

In determining the presence or absence of corrosion, the thickness of the pipe wall is determined. If the pipe wall is electrically thinner than it should be, the presence of corrosion is inferred. If the pipe wall is electrically normal in thickness, the absence of corrosion is inferred.

The antenna distance is determined by the thickness of the insulation, because the antennas are placed on the outside of the insulation. The thickness of the insulation varies from location to location on the pipeline, thus causing the antenna distance to vary from location to location.

I have discovered that, for loop-loop antenna configurations, pipe wall thickness strongly affects the magnitude of the maximum of the received signal, but only weakly affects the arrival time of the maximum. The thinner the pipe wall, the larger the maximum; conversely the thicker the pipe wall, the smaller the maximum. The arrival time for thin pipe walls is slightly earlier than for thicker pipe walls. Eddy currents diffuse faster in thinner walls because of the larger gradients present in the thinner walls. Furthermore, it has been discovered that the distance between the antennas and the pipe wall strongly affects the arrival time of the maximum, but only weakly affects the magnitude of the maximum. This is illustrated in FIG. 2, where received signals A and B were obtained over the same pipe wall portions so that the pipe wall thickness for received signals A and B is the same. Received signal A was obtained with an antenna distance greater than the antenna distance of received signal B. The arrival time of the maximum of received signal A is earlier than the arrival time of the maximum of received signal B. However, the maximums of received signals A and B are similar. Heretofore, it was believed that antenna distance strongly affects the magnitude of the maximum of the received signal.

Figure 4:
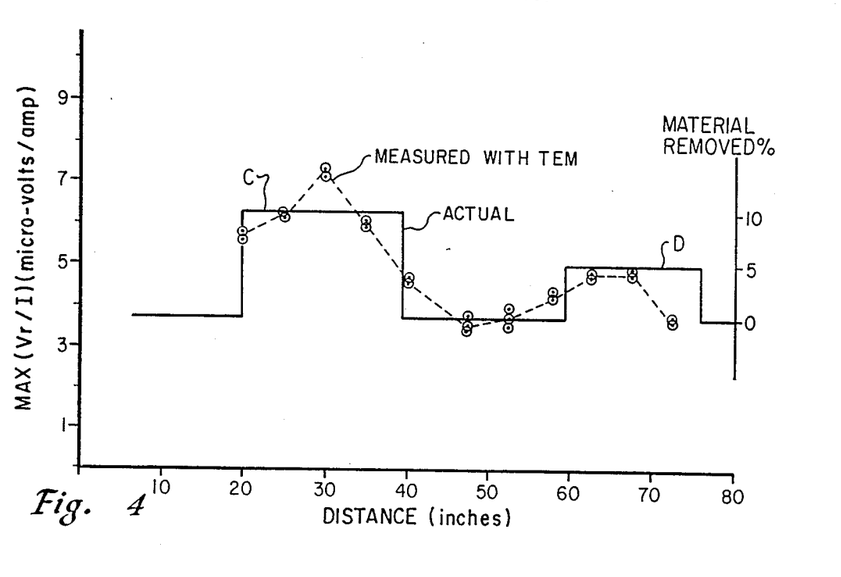
FIG. 4 is a graph showing the maximum voltages of plural received signals obtained from a linear portion of a pipeline having pits.

By examining the received signals to determine the maximums and the arrival times of those received signals, an indication of the presence or absence of irregularities such as corrosion can be obtained. The actual maximum of a received signal is determined by using quadratic interpolation of the data points located nearest to the supposed maximum. In FIG. 4, there is shown a graph of maximums of received signals which were obtained from a linear section of pipe with a constant antenna distance. The pipe (the profile of which is represented by the unbroken line) has been manually worked to create pits C and D with 10% metal loss and 5% metal loss respectively. The maximum voltages (connected by dashed lines) form a measured profile that approximates the actual profile. In the center of the pits, the maximum voltages are greater than are the maximum voltages obtained from unpitted portions of the wall. Also, the maximum voltage in the center of the 10% wall loss pit C is greater than the maximum voltage in the center of the 5% wall loss pit D.

Figure 3:
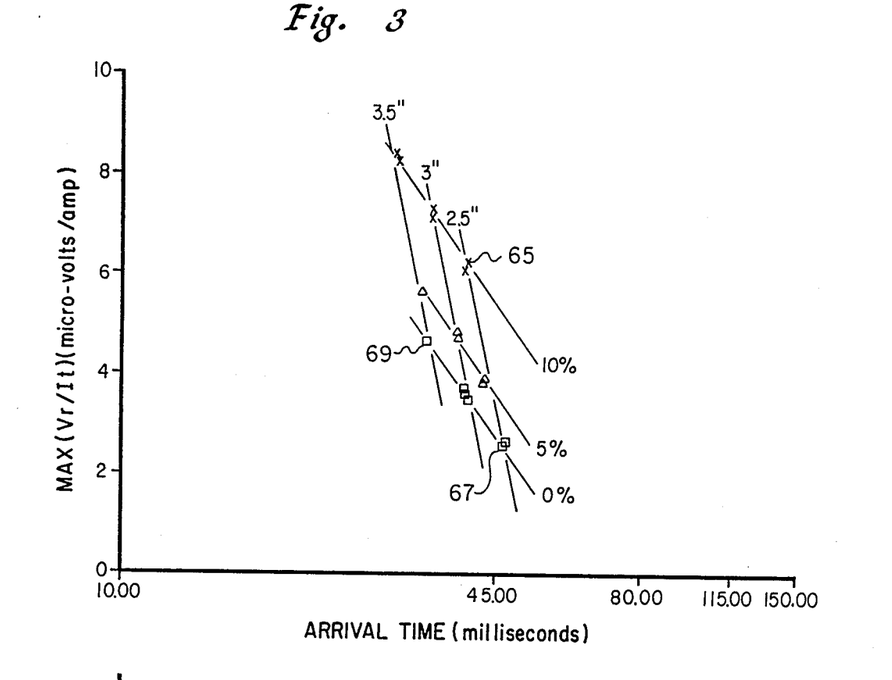
FIG. 3 is a graph showing the maximum voltages of plural received signals plotted with respect to the arrival time of the maximum voltages, there being shown scale lines superimposed thereon.

Because the distance between the antennas and the pipe wall has a slight affect on the maximums of the received signals, merely looking at maximums alone makes measurements of pipe wall thickness difficult. To permit accurate quantitative measurements of wall thickness, the affects on the maximums caused by the variations in distance between the antennas and the pipe wall should be distinguishable from the affects on the maximums caused by the wall thickness. To separate the parameter of wall thickness from the parameter of antenna distance, the maximum voltages are examined relative to the respective arrival times. Referring to FIG. 3, the maximum voltages are plotted with respect to the respective arrival times for a pipeline. A scale has been constructed on the graph, which scale is shown as respective lines of invariance for wall thickness (represented as percent wall loss) and for antenna distance. Thus, there are scale lines for constant wall loss and scale lines for constant antenna distances. For a constant antenna distance, changes in pipe wall thickness strongly affects the maximum voltage of the received signal and only weakly affects the arrival time. For a constant pipe wall thickness, changes in antenna distance strongly affects the arrival time and weakly affects the maximum voltage of the received signal.

By acquiring data in the form of received signals from a pipe having known parameters, and particularly known wall thicknesses and antenna distances, a calibrated reference scale can be constructed for that type of pipe. To construct a calibrated reference scale, at least three reference received signals 65, 67, 69 must be obtained from a reference pipeline (see FIG. 3). Two of these reference signals 67, 69 are obtained from the same pipe wall thickness; the other reference signal 65 is obtained from a different pipe wall thickness. Two of the reference signals 65, 67 are obtained with the same antenna distance; the other reference signal 69 is obtained with a different antenna distance. The three reference signals allow the construction of the lines of invariance, from which other points can be extrapolated. Data from similar type of pipes can be compared to the reference scale so that the wall thickness can be determined. Linear interpolation can be used to quantitatively determine the wall thickness.

Qualitative measurements of wall thickness can be made by determining the maximum and arrival time of the received signal obtained from the investigated pipe wall portion and comparing the maximum and the arrival time to the maximums and arrival times of other received signals obtained from other portions of the pipe wall. The maximums of the other received signals which have an arrival time similar to the arrival time of the maximum of the investigated received signal are selected. The maximum of the investigated received signal is then compared to the selected maximums to obtain an indication of wall thickness relative to other areas of the pipe wall. The variations in antenna distance over the areal extent of measurements are reduced by comparing those maximums which have similar arrival times.

Although this invention has been described with a certain degree of particularity, it is understood that the present disclosure is made only by way of example and that numerous changes in the details of construction and the combination and arrangement of parts may be resorted to without departing from the spirit and scope of the invention, reference being had for the latter purpose to the appended claims.

I claim:

1. A method for detecting irregularities on electrically conductive walls of container means, comprising the steps of:
   (a) providing transmitting antenna means and transmitter means connected with said transmitting antenna means;
   (b) providing receiving antenna means and receiver means connected with said receiving antenna means;
   (c) placing said transmitting antenna means in proximity to that portion of the container means wall which is to be investigated;
   (d) placing said receiving antenna means in proximity to the container means wall portion and in proximity to said transmitting antenna means, said receiving antenna means being separated from said transmitting antenna means;
   (e) providing an abruptly changing current to said transmitting antenna means from said transmitter means so as to induce current into the container means wall portion;
   (f) detecting the presence of and the decay of said induced current in said container means wall portion with said receiving antenna means to produce a received signal, said received signal having an intermediate time range and a late time range, said received signal having a maximum occurring in the intermediate or late time ranges, said received signal having an arrival time which is the time when said maximum occurs;
   (g) examining said received signal to determine the maximum of said received signal and examining the received signal to determine the arrival time of said maximum, said maximum and said arrival time providing an indication of the presence or absence of irregularities in said container means wall portion, wherein the presence of irregularities is indicated by a maximum which is greater than a maximum obtained from an irregularity-free container means wall portion.

2. The method of claim 1 wherein said container means wall is provided with a layer of insulation, such that said insulation is interposed between said container means wall portion and said transmitting antenna means and receiving antenna means.

3. The method of claim 2 wherein said irregularities typically occur in bands, said bands lying in a supposed direction, said receiving antenna means being placed relative to said transmitting antenna means so that an imaginary line extending through said receiving and transmitting antenna means is parallel to the supposed direction of said bands.

4. The method of claim 3 wherein plural receiving antenna means are provided and placed in proximity to said transmitting antenna means.

5. A method for detecting irregularities on electrically conductive walls of container means, comprising the steps of:
(a) providing transmitting antenna means and transmitter means connected with said transmitting antenna means;
(b) providing receiving antenna means and receiver means connected with said receiving antenna means;
(c) placing said transmitting antenna means in proximity to that portion of the container means wall which is to be investigated;
(d) placing said receiving antenna means in proximity to the container means wall portion and in proximity to said transmitting antenna means, said receiving antenna means being separated from said transmitting antenna means;
(e) providing an abruptly changing current to said transmitting antenna means from said transmitter means so as to induce current into the container means wall portion;
(f) detecting the presence of and the decay of said induced current in said container means wall portion with said receiving antenna means to produce a received signal, said received signal having an intermediate time range and a late time range, said received signal having a maximum occurring in the intermediate or late time ranges, said received signal having an arrival time which is the time when said maximum occurs;
(g) examining said received signal to determine the maximum of said received signal and examining the received signal to determine the arrival time of said maximum;
(h) comparing said arrival time of said maximum to the arrival times of other maximums of other received signals obtained from other portions of the container means wall;
(i) selecting the maximums of said other received signals that have arrival times similar to said maximum of said investigated container means wall portion, and comparing said maximum of said investigated container means wall portion to the selected maximums of said other portions of the container means wall.

6. The method of claim 5 wherein said container means wall is provided with a layer of insulation, such that said insulation is interposed between said container means wall portion and said transmitting antenna means and receiving antenna means.

7. The method of claim 6 wherein said irregularities typically occur in bands, said bands lying in a supposed direction, said receiving antenna means being placed relative to said transmitting antenna means so that an imaginary line extending through said receiving and transmitting antenna means is parallel to the supposed direction of said bands.

8. The method of claim 7 wherein plural receiving antenna means are provided and placed in proximity to said transmitting antenna means.

9. A method for detecting irregularities on electrically conductive walls of container means, comprising the steps of:
(a) providing transmitting antenna means and antenna means;
(b) providing receiving antenna means and receiver means connected with said receiving antenna means;
(c) placing said transmitting antenna means in proximity to that portion of the container means wall which is to be investigated;
(d) placing said receiving antenna means in proximity to the container means wall portion and in proximity to said transmitting antenna means, said receiving antenna means being separated from said transmitting antenna means;
(e) providing an abruptly changing current to said transmitting antenna means from said transmitter means so as to induce current into the container means wall portion;
(f) detecting the presence of and the decay of said induced current in said container means wall portion with said receiving antenna means to produce a received signal, said received signal having an intermediate time range and a late time range, said received signal having a maximum occurring in the intermediate or late time ranges, said received signal having an arrival time which is the time when said maximum occurs;
(g) determining the maximum and the arrival time of the received signal and comparing the maximum and the arrival time of the received signal to reference maximums and reference arrival times to determine the wall thickness of said container means wall portion, said reference maximums and reference arrival times obtained from reference container means with known wall thicknesses.

10. The method of claim 9 wherein said container means wall is provided with a layer of insulation, such that said insulation is interposed between said container means wall portion and said transmitting antenna means and receiving antenna means.

11. The method of claim 10 wherein said irregularities typically occur in bands, said bands lying in a supposed direction, said receiving antenna means being placed relative to said transmitting antenna means so that an imaginary line extending through said receiving and transmitting antenna means is parallel to the supposed direction of said bands.

12. The method of claim 11 wherein plural receiving antenna means are provided and placed in proximity to said transmitting antenna means.

13. The method of claim 9 wherein said maximum occurs after said received signal changes sign.

14. A method for detecting irregularities on electrically conductive walls of container means, comprising the steps of:
(a) providing transmitting antenna means and transmitter means connected with said transmitting antenna means;
(b) providing receiving antenna means and receiver means connected with said receiving antenna means;
(c) placing said transmitting antenna means in proximity to that portion of the container means wall which is to be investigated;
(d) placing said receiving antenna means in proximity to the container means wall portion and in proximity to said transmitting antenna means, said receiving antenna means being separated from said transmitting antenna means;
(e) providing an abruptly changing current to said transmitting antenna means from said transmitter means so as to induce current into the container means wall portion;

(f) detecting the presence of and the decay of said induced current in said container means wall portion with said receiving antenna means to produce a received signal, said received signal having an initial portion occurring immediately after said abruptly changing current is provided to said transmitting antenna means, said received signal also having a maximum occurring after said initial portion, said received signal having an arrival time which is the time when said maximum occurs;

(g) determining the maximum and the arrival time of said received signal and comparing the maximum and the arrival time of said received signal to a maximum and its respective arrival time of a reference signal, said reference signal being obtained from a reference container means.

15. The method of claim 14 wherein said receiving antenna means is placed in proximity to said transmitting antenna means such that said receiving antenna means is displaced along said container means wall portion from said transmitting antenna means.

16. The method of claim 15 wherein said container means comprises a pipeline, wherein said transmitting antenna means and said receiving antenna means are placed in proximity to a portion of said pipeline wall.

17. The method of claim 14 wherein said container means comprises a pipeline, wherein said transmitting antenna means and said receiving antenna means are placed in proximity to a portion of said pipeline wall.

18. A method for detecting irregularities on electrically conductive walls of container means, comprising the steps of:
(a) providing transmitting antenna means and transmitter means connected with said transmitting antenna means;
(b) providing receiving antenna means and receiver means connected with said receiving antenna means;
(c) placing said transmitting antenna means and said receiving antenna means in proximity to that portion of the container means wall which is to be investigated such that said transmitting antenna means and said receiving antenna means are separated from said container means wall portion, said receiving antenna means being separated from said transmitting antenna means;
(d) providing an abruptly changing current to said transmitting antenna means from said transmitter means so as to induce current into the current means wall portion;
(e) detecting the presence of and the decay of said induced current in said container means wall portion with said receiving antenna means to produce a received signal, said received signal having an initial portion occurring immediately after said abruptly changing current is provided to said transmitting antenna means, said received signal also having a maximum occurring after said initial portion, said received signal having an arrival time which is the time when said maximum occurs;
(f) determining the maximum and the arrival time of said received signal and comparing the maximum and the arrival time of said received signal to a maximum and its respective arrival time of a reference signal, said reference signal being obtained from a reference container means.

19. The method of claim 18 wherein said container means comprises a pipeline wrapped with insulation, said transmitting antenna means and said receiving antenna means being placed on said pipeline such that the insulation is interposed between said pipeline and said transmitting antenna means and said receiving antenna means.

20. A method for detecting irregularities on electrically conductive walls of container means, comprising the steps of:
(a) providing transmitting antenna means and transmitter means connected with said transmitting antenna means;
(b) providing receiving antenna means and receiver means connected with said receiving antenna means;
(c) placing said transmitting antenna means in proximity to that portion of the container means wall which is to be investigated;
(d) placing said receiving antenna means in proximity to the container means wall portion and in proximity to said transmitting antenna means, said receiving antenna means being separated from said transmitting antenna means;
(e) energizing said transmitting antenna means with current for a sufficient period of time to stabilize the magnitude of the current in said transmitting antenna means, and then abruptly deenergizing said transmitting antenna means so as to induce current into the container means wall portion;
(f) detecting the presence of and the decay of said induced current in said container means wall portion with said receiving antenna means to produce a received signal, said received signal having an initial portion occurring immediately after said transmitting antenna means is abruptly deenergized, said received signal also having a maximum occurring after said initial portion, said received signal having an arrival time which is the time when said maximum occurs;
(g) determining the maximum and the arrival time of said received signal and comparing the maximum and the arrival time of said received signal to a maximum and its respective arrival time of a reference signal, said reference signal being obtained from a reference container means.

21. The method of claim 20 wherein said receiving antenna means is placed in proximity to said transmitting antenna means such that said receiving means is displaced along said container means wall portion from said transmitting antenna means.

22. The method of claim 21 wherein said container means comprises a pipeline, wherein said transmitting antenna means and said receiving antenna means are placed in proximity to a portion of said pipeline wall.

23. The method of claim 22 wherein said irregularities comprise corrosion that occurs in longitudinal bands along said pipeline, said receiving antenna means being displaced from said transmitting antenna means in a longitudinal direction.

24. The method of claim 23 wherein plural receiving antenna means are provided and placed on said pipeline.

25. The method of claim 24 wherein said transmitting antenna means is energized a first time and then abruptly deenergized, followed by energizing said transmitting antenna means a second time and then abruptly deenergizing said transmitting antenna means, wherein when said transmitting antenna means is energized the second time the polarity of energization is opposite to the polarity of the first energization of said transmitting antenna means.

26. The method of claim 24 wherein at least one of said receiving antenna means is displaced from said transmitting antenna means in a circumferential direction on said pipeline.

27. The method of claim 22 wherein said receiving antenna means is displaced from said transmitting antenna means in a circumferential direction on said pipeline.

28. The method of claim 20 wherein said transmitting antenna means is energized a first time and then abruptly deenergized, followed by energizing said transmitting antenna means a second time and then abruptly deenergizing said transmitting antenna means, wherein when said transmitting antenna means is energized the second time the polarity of energization is opposite to the polarity of the first energization of said transmitting antenna means.

29. A method for detecting corrosion on electrically conductive walls of container means, said corrosion acting to reduce the wall thickness of said conductive wall, comprising the steps of:
  (a) providing transmitting antenna means and transmitter means connected with said transmitting antenna means;
  (b) providing receiving antenna means and receiver means connected with said receiving antenna means;
  (c) placing said transmitting antenna means in proximity to that portion of the container means wall which is to be investigated;
  (d) placing said receiving antenna means in proximity to the container means wall portion and in proximity to said transmitting antenna means, said receiving antenna means being separated from said transmitting antenna means;
  (e) providing an abruptly changing current to said transmitting antenna means from said transmitter means so as to induce current into the container means wall portion;
  (f) detecting the presence of and the decay of said induced current in said container means wall portion with said receiving antenna means to produce a received signal, said received signal having an initial portion occurring immediately after said abruptly changing current is provided to said transmitting antenna means, said received signal also having a maximum occurring after said initial portion, said received signal having an arrival time which is the time when said maximum occurs;
  (g) determining the maximum and the arrival time of the received signal and comparing the maximum and the arrival time of the received signal to reference maximums and reference arrival times to determine the wall thickness of said container means wall portion, said reference maximums and reference arrival times obtained from reference container means with known wall thicknesses.

* * * * *

UNITED STATES PATENT AND TRADEMARK OFFICE
CERTIFICATE OF CORRECTION

PATENT NO. : 4,929,896

DATED : May 29, 1990

INVENTOR(S) : Pedro F. Lara

It is certified that error appears in the above-identified patent and that said Letters Patent is hereby corrected as shown below:

Column 9, line 64, after "and", insert "transmitter means connected with said transmitting";

Column 12, line 48, after "receiving", insert "antenna".

Signed and Sealed this

Fourth Day of June, 1991

*Attest:*

HARRY F. MANBECK, JR.

*Attesting Officer*　　　　*Commissioner of Patents and Trademarks*